US008223367B2

(12) United States Patent
Ishigaki

(10) Patent No.: US 8,223,367 B2
(45) Date of Patent: Jul. 17, 2012

(54) DOCUMENT PROCESSING APPARATUS AND METHOD FOR CREATING AN IMAGE OF INFORMATION IDENTIFYING A DOCUMENT

(75) Inventor: Toru Ishigaki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 830 days.

(21) Appl. No.: 12/211,455

(22) Filed: Sep. 16, 2008

(65) Prior Publication Data

US 2009/0237708 A1    Sep. 24, 2009

(30) Foreign Application Priority Data

Mar. 21, 2008    (JP) .................................. 2008-073831

(51) Int. Cl.
G06F 3/12      (2006.01)
G06F 3/048     (2006.01)
G06K 9/60      (2006.01)

(52) U.S. Cl. ...................................................... 358/1.15
(58) Field of Classification Search .................. 358/474; 359/196.1; 707/638, 690, 694, 695, 722
See application file for complete search history.

(56) References Cited

U.S. PATENT DOCUMENTS

| 4,641,197 | A | * | 2/1987 | Miyagi | ......................... | 358/450 |
| 5,102,341 | A | * | 4/1992 | Koslin | ........................... | 434/353 |
| 5,825,943 | A | * | 10/1998 | DeVito et al. | .................. | 382/306 |
| 5,881,214 | A | * | 3/1999 | Morisawa et al. | ........... | 358/1.18 |
| 6,005,680 | A | * | 12/1999 | Luther et al. | .................... | 358/2.1 |
| 6,816,630 | B1 | * | 11/2004 | Werth et al. | ..................... | 382/287 |
| 7,551,796 | B2 | * | 6/2009 | Ohyama et al. | ............... | 382/274 |
| 7,712,671 | B2 | * | 5/2010 | Cattrone et al. | ............... | 235/487 |
| 2003/0055685 | A1 | * | 3/2003 | Cobb et al. | ......................... | 705/3 |
| 2006/0044619 | A1 | * | 3/2006 | Namiki et al. | ................ | 358/3.28 |
| 2006/0209089 | A1 | * | 9/2006 | Date | .............................. | 345/632 |
| 2007/0177824 | A1 | * | 8/2007 | Cattrone et al. | ............... | 382/306 |
| 2008/0209549 | A1 | * | 8/2008 | Ishigaki | .......................... | 726/21 |
| 2009/0323126 | A1 | * | 12/2009 | Klotz et al. | .................. | 358/3.28 |

FOREIGN PATENT DOCUMENTS

| JP | 6-60162 A | 3/1994 |
| JP | 3068479 B2 | 5/2000 |
| JP | 2005-210563 A | 8/2005 |
| JP | 2006-40069 A | 2/2006 |

* cited by examiner

Primary Examiner — Twyler Haskins
Assistant Examiner — Barbara Reinier
(74) Attorney, Agent, or Firm — Sughrue Mion, PLLC

(57) ABSTRACT

A document processing apparatus includes: a storage that stores a manner of a document on which a document processing is performed in a series of tasks; a creating unit that creates an instructing image including an image of information identifying the document, an image of the manner, and an image of a first entry column on which an information indicating that a manner of an actual document is different from the stored manner is entered; an output unit that outputs the instructing image; a receiving unit that receives a read-instructing image corresponding to the instructing image, the read-instructing image being read by an image reading device; an extracting unit that extracts first information entered on a second entry column provided in the read-instructing image and second information identifying the document; and a storage that correlates the first information and the second information, and that stores the correlated information.

13 Claims, 7 Drawing Sheets

FIG. 2

| KIND OF VOUCHER | SUPPOSED PRINTING MANNER |
|---|---|
| a a a a | TWO PAGES IN TOTAL, A4 SIZE, SINGLE-SIDED |
| b b b b | FOUR PAGES IN TOTAL, A4 SIZE, DOUBLE-SIDED |
| ⋮ | ⋮ |

*FIG. 4*

| TASK IDENTIFIER | PERSON IN CHARGE | CLIENT | START | END | VOUCHERS | | | | |
|---|---|---|---|---|---|---|---|---|---|
| | | | | | KIND | DATE | KIND | DATE | ... |
| x x x x | k k k k | n n n n | yy.mm.dd | yy.mm.dd | a a a a | yy.mm.dd | b b b b | ... | ... |
| y y y y | m m m | p p p p | yy.mm.dd | yy.mm.dd | ... | ... | ... | ... | ... |
| ... | ... | ... | ... | ... | ... | ... | ... | ... | ... |

| DOCUMENT IMAGE | DOCUMENT IDENTIFIER | READING CONDITION |
|---|---|---|
| | 0012 | TWO PAGES<br>A4<br>DOUBLE-SIDED |
| | 0012 | |
| ⋮ | ⋮ | ⋮ |

DOCUMENT PROCESSING APPARATUS AND METHOD FOR CREATING AN IMAGE OF INFORMATION IDENTIFYING A DOCUMENT

CROSS-REFERENCE TO RELATED APPLICATIONS

This application is based on and claims priority under 35 U.S.C. 119 from Japanese Patent Application No. 2008-073831 filed Mar. 21, 2008.

BACKGROUND

1. Technical Field

This invention relates to a document processing apparatus, a document processing method, and a computer readable medium.

2. Related Art

In recent years, the importance of companies' internal controls has been recognized.

As this internal controls over financial reporting, the "Internal Control-Integrated Framework" published by COSO (the Committee of Sponsoring Organization of the Treadway Committee) in 1992 is a de-facto standard.

It is defined as a process, effected by an entity's board of directors, management and other personnel, designed to provide reasonable assurance regarding the achievement of objectives in the following categories: (1) effectiveness and efficiency of operations, (2) reliability of financial reporting and (3) compliance with applicable laws and regulations.

In this internal control of financial reporting, assessments of a business process are done for an audit. In this case, it is required to match various vouchers used in the assessment of the control.

SUMMARY

According to an aspect of the present invention, a document processing apparatus includes: a storage that stores a manner of a document on which a document processing is performed in a series of tasks; a creating unit that creates an instructing image including an image of information identifying the document, an image of the manner stored in the storage, and an image of a first entry column on which an information indicating that a manner of an actual document is different from the stored manner is entered; an output unit that outputs the instructing image created by the creating unit; a receiving unit that receives a read-instructing image corresponding to the instructing image, the read-instructing image being read by an image reading device connected through a communicating line; an extracting unit that extracts first information entered on a second entry column provided in the read-instructing image received by the receiving unit and second information identifying the document; and a storage that correlates the first information and the second information, and that stores the first information and the second information correlated with each other.

BRIEF DESCRIPTION OF THE DRAWINGS

Exemplary embodiment of the present invention will be described in detail based on the following figures, wherein:

FIG. 2 is a view for explaining an example of the database of a printing manner employed by a document processing apparatus according to an embodiment of this invention;

FIG. 4 is a view for explaining the contents of the database of a business process which can be employed in a certain example of the document processing apparatus according to an embodiment of this invention;

FIG. 5 is a view for explaining an example of the instructing image created by the document processing apparatus according to an embodiment of this invention;

FIG. 6 is a view for explaining an example of the storing manner of a document in a document processing system according to an embodiment of this invention.

DETAILED DESCRIPTION

Figure 1:
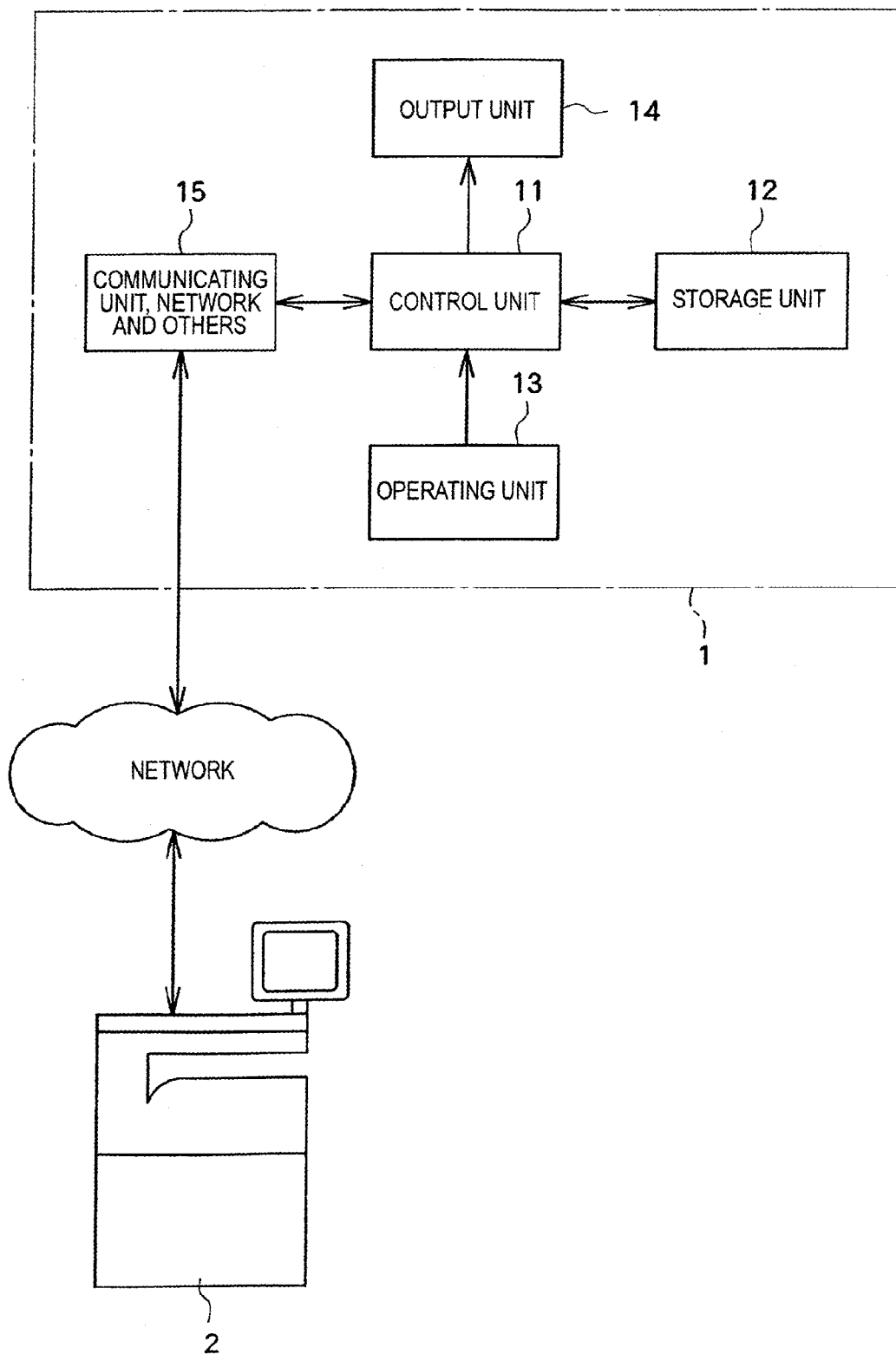
FIG. 1 is a constitutional block diagram showing an example of the document processing system according to an embodiment of this invention.

Now referring to the drawings, an explanation will be given of an embodiment of this invention. The document processing system according to an embodiment of this invention, as illustrated in FIG. 1, includes a document processing apparatus 1 and a scanner 2. In the explanation made herein, it is assumed that the system or device includes not only a plurality of computers connected by a communication means such as a network but also a single computer.

It is further assumed that the word "database" has only to have a function of generally storing data and does not have the limitation other than the structure of data storage particularly described. Further, the database described herein may not provide a function of retrieval and may provide various functions including retrieval.

As an example, it is assumed that a document processing apparatus 1 described herein includes a control unit 11, a storage unit 12, an operating unit 13, an output unit 14 and a communicating unit 15.

The control unit 11 is a program control device such as a CPU (Central Processing Unit). The control unit 11 operates according to the program stored in the storage unit 12. In this embodiment, from a planner of match of the voucher for an audit (hereinafter referred to a planner), the control unit 11 receives an input of information specifying the voucher which is an object of match by designating the business process which the planner wants to audit. The vouchers processed during a predetermined period by the business process specified by the information received are extracted, and the information on the printing manner of each voucher extracted is acquired. The information on the printing manner of the voucher includes the number of pages, paper size, distinction of double-sided/single-sided printing, layout, title, printed items, etc. of the voucher supposed as the voucher extracted. The control unit 11, as an image for instructing to collect vouchers (instructing image), creates an image which correlates the information indicative of the voucher specified by the information received and information on the printing manner acquired for each voucher with an entry column on which the fact that the manner of the voucher actually existing is different from the information on the pertinent printing manner is described. The detailed processing of the control unit 11 will be explained later.

The storage unit 12 includes a storage element such as a RAM (Random Access Memory) and a storage device such a hard disk. The storage unit 12 stores a program executed by the control unit 11. The program may be one copied or installed from a computer-readable recording medium such as a DVD-ROM. The storage unit 12 also operates as a work memory of the control unit 11. Further, the storage unit 12 holds, for the vouchers which may be the object of match, a task database in which they are correlated with the information on the printing manners supposed. For example, the storage unit 12, as illustrated in FIG. 2, holds a table on which the information indicative of the kind of voucher is correlated with the information indicative of the printing manner supposed for each kind of voucher. In this case, the control unit 11 may acquire, referring to this table, the information on the printing manner corresponding to the kind of voucher which is an object of match.

The operating unit 13 is a keyboard or mouse device, which receives the operation by the planner. The planner operates the operating unit 13 to input the information specifying the voucher which is an object of match and to execute other operations.

The output unit 14 includes a display or a printer. The output unit 14 displays or prints-out the information according to the instruction inputted from the control unit 11.

The communicating unit 15 is e.g. a network interface which transmits or receives the information to and from a scanner 2 or an external computer via the communicating means as a network. For example, the communicating unit 15 receives the image data read by the scanner 2 and outputs it the control unit 11.

The scanner 2 is a device having a scanning function of reading the image of a document. The scanner 2 is connected to the document processing apparatus 1 via the communicating line means such as a network, and transmits the information on the image read to the document processing apparatus 1.

Figure 3:
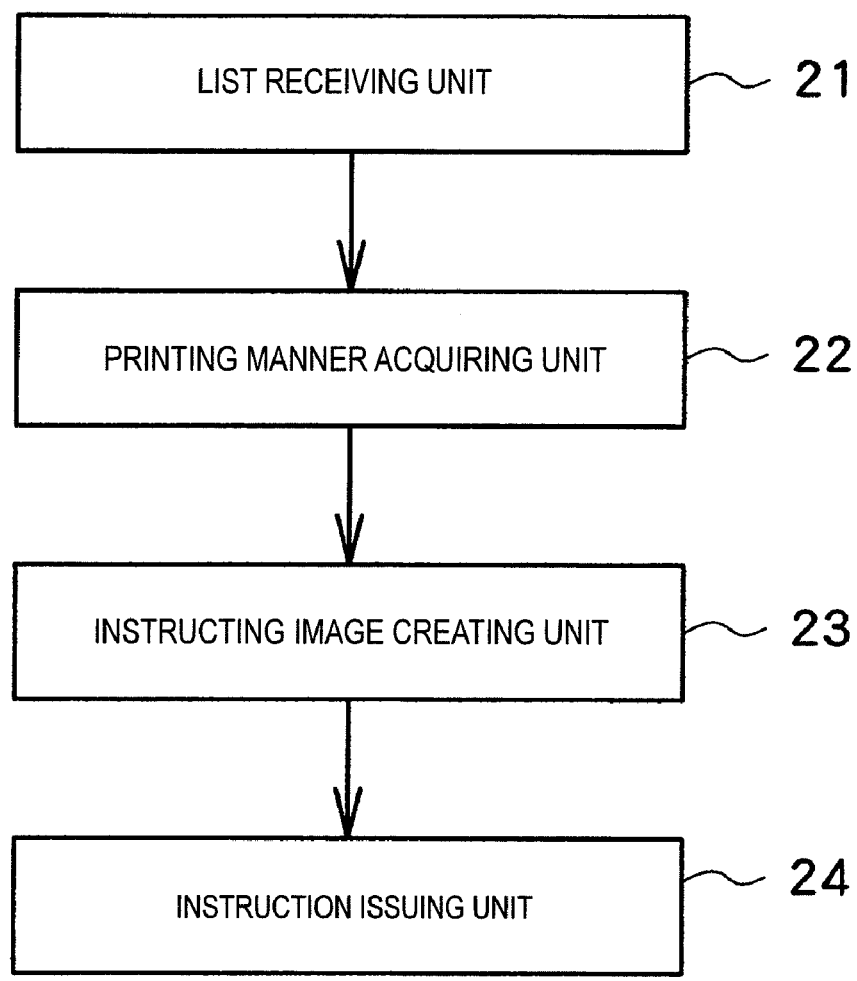
FIG. 3 is a functional block diagram of an example of the document processing apparatus according to an embodiment of this invention.

Next, an explanation will be given of the detailed contents of the processing executed by the control unit 11 of the document processing apparatus 1. The control unit 11 according to this embodiment, as functionally illustrated in FIG. 3, includes a list receiving unit 21, a printing manner acquiring unit 22, an instructing image creating unit 23 and an instruction issuing unit 24.

The list receiving unit 21 receives the information specifying the voucher which is an object of match from the planner. In the audit of the internal control of financial affairs, for example, in order to match in a certain business process whether or not the voucher processed in the business process has been suitably processed, by collecting the actual vouchers processed in the pertinent business process during a past predetermined period and checking the accounting data processed by the business process and managed by the task database (accounting data in the case of the business process of e.g. receipt processing) against the above actual vouchers themselves or data described in the vouchers, it is necessary to audit whether or not the business process has been suitably processed and whether or not the environment for suitably processing the business process has been prepared.

The planner makes a plan for auditing what business process has been processed during what period. The planner specifies the business process to be audited along this plan. On the basis of the data processed in each business process and the task database managing the vouchers processed in the business process, for the vouchers extracted to correspond to business process specified by the planner, the list receiving unit 21 will create a document (document forming an instructing image) for requiring a department keeping the vouchers to collect actual vouchers. This requiring document will be sent to a voucher collector in the department keeping.

The voucher collection may be done in such a manner that the voucher collector takes out the actual voucher from a keeping cabinet on the basis of the information for specifying the voucher described on the requiring document, reads the image of the actual voucher using the scanner 2 and registers the image thus read in the task database.

Namely, the list receiving unit 21 receives the information on the vouchers for which the planner has decided that they must be collected, and records the list of vouchers specified by the received information as an object of match in the storage unit 12. The information for specifying the voucher may be, for example, the information (e.g. a receipt or written order) specifying the kind of voucher, an essential document identifier (e.g. a document number, receipt number or written order number) previously given to the voucher, processing date or a name of the person in charge of the business processing.

The list receiving unit 21 needs not directly receive the document identifier. For example, for each task to be performed, for at least one voucher used in each task, the task database (task flow database) correlated with the information specifying the kind of the voucher may be referred to. Specifically, in this case, for concrete individual task flows, the vouchers exchanged are added with essential document identifiers and held as the database. On the database, as shown in FIG. 4, for the task actually performed, recorded are the information specifying the kind of the pertinent task and information on the contents of the task (person in charge of the task, client, dates of start and end, etc.) and also the document identifier of the voucher exchanged in the pertinent business process correlated with the information specifying the kind of voucher and date of transaction, etc.

The list receiving unit 21 receives from the planner the information on the kind of the business process which is an object of match and extracts, from the task database, the number of samples necessary to audit the pertinent business process of the kind received (e.g. the number of samples extracted under the condition of 30 vouchers extracted at random and having a transaction amount of a predetermined amount or more from cases processed in the past one year). The list receiving unit 21 may record the document identifiers correlated with the business process extracted as a list of vouchers which are an object of match.

The printing manner acquiring unit 22, referring to the list of vouchers recorded by the list receiving unit 21, for each of the vouchers contained in the list, reads out the information on the printing manner corresponding to the kind of voucher from the task database. For example, on the task database, if the pertinent kind of voucher is an order, as described above, correlated is the information on the printing manner which is the format as a printed matter or the contents described of the voucher processed, such as "total two pages, A4 size, single-sided, title: written order, order form number: 1234, receipt processing date: Mar. 7, 2008". Thus, the information on the printing manner such as "total two pages, A4 size, single-sided, title: written order, order form number: 1234, receipt processing date: Mar. 7, 2008" will be acquired.

Figure 5:
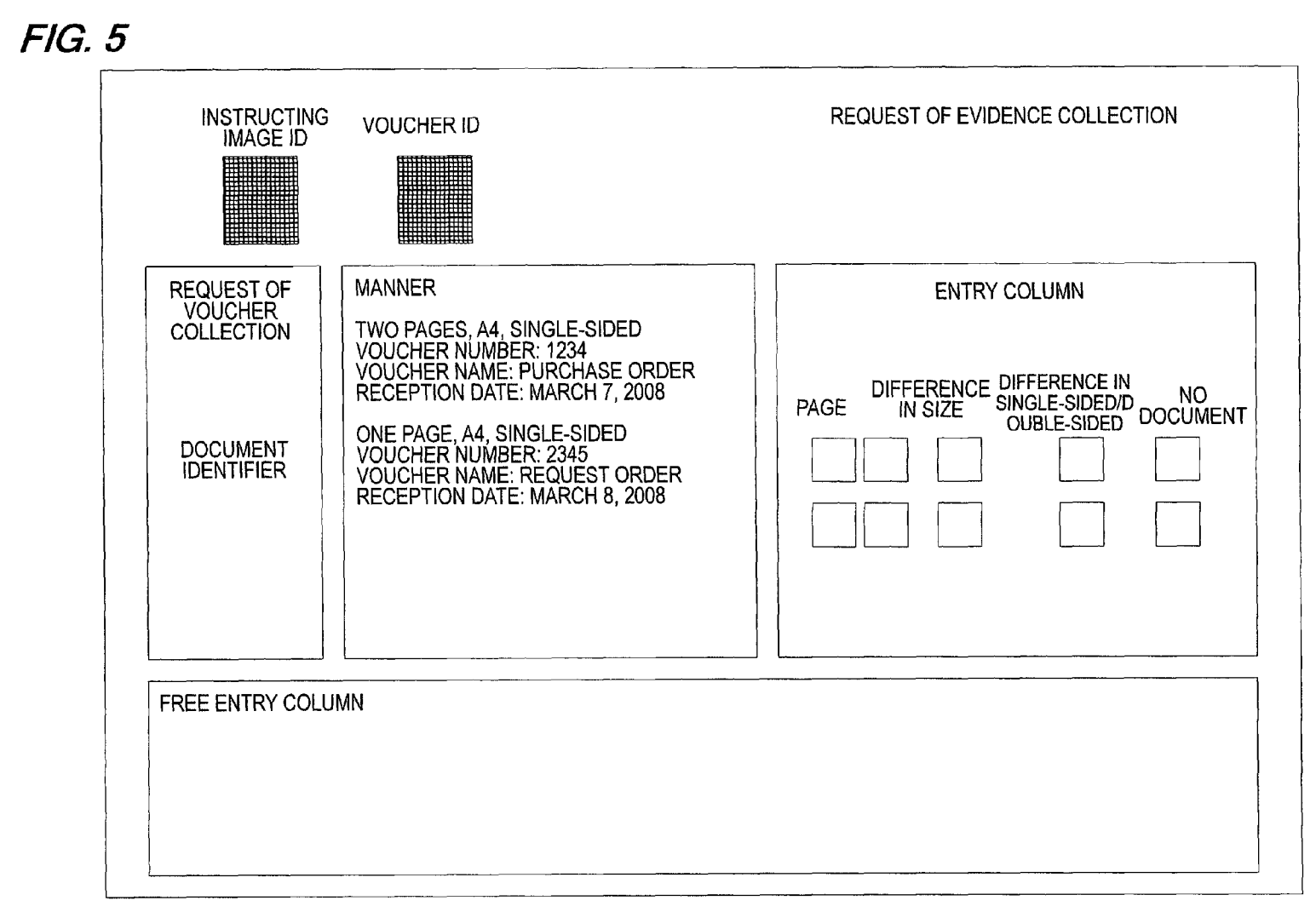

The instructing image creating unit 23 creates the instructing image as illustrated in FIG. 5. On the instructing image, for each of the vouchers recorded as an object of match, correlated with one another are the information (A) (e.g. document identifier of the voucher) necessary for collection, information (B) on the printing manner, an entry column (C) on which a voucher collector is to enter the information representing that the pertinent printing manner is different from an actual printing manner, and a free entry column (D).

The information on the document identifier and printing manner may be represented in a character string or otherwise in a computer-readable code image (e.g. a bar code).

Now, the entry column (C) includes a column (C1) for entering the actual number of pages where the number of pages described on e.g. the instructing image is different from the number of pages of an actual voucher; and a checking column (C2) representing that the manner of the single-sided/double-sided differs. Further, the entry column (C) may includes a checking column (C3) for entering, if the designated voucher cannot be found, this fact (there is no document). The instructing image creating unit 23 outputs the instructing image thus created to the instruction issuing unit 24.

The instruction issuing unit 24 sends the instructing image outputted from the instructing image creating unit 23 to a designated destination through the communicating unit 15. Now, the destination is e.g. a mail address of the voucher collector which may be previously determined or designated by the planner. Further, where it is designated by the planner, for example, it may be selected from a list of mail addresses of voucher collectors kept for certification.

Specifically, in the document processing apparatus 1 according to this embodiment, according to the plan for an audit about the business process made by the planner, the voucher used in the processing of the business process is determined as the voucher to be collected and the information on the form (printing manner) managed in the voucher database about the voucher determined is acquired. Further, created is an instructing image having an entry column which permits to enter that the form of the voucher actually collected by the voucher collector is different from a designated form and that the voucher designated is not found. The instructing image is transmitted to the voucher collector.

The voucher collector receives the instructing image via an electronic mail by his own personal computer, and prints out it by a printer. The voucher collector, referring to the information for discriminating the voucher described on the instructing image printed, collects the designated voucher. For example, the voucher collector, referring to the document identifier of the voucher, takes out the corresponding voucher from a keeping cabinet. Further, the printing manner of the actual voucher taken out is compared with the information on the printing manner supposed about the pertinent voucher, described on the instructing image.

As regards the voucher having the printing manner different from the supposed printing manner, the information on the actual printing manner is entered in the corresponding entry column. The free entry column (D) is an column on which any information such as a difference other than the information describable on the entry column (C) or the matter noticed by the voucher collector is described. The voucher collector fills out the free entry column by handwriting. The voucher collector causes the scanner 2 to read the paper on which the instructing image thus filled out is printed and also the actual voucher collected.

Now, where the scanner 2 is provided with a device ("ADF (Automatic Document Feeder)) which serves to send paper media set for reading one by one or inside out, the voucher collector may set the paper with the instructing image printed thereon and the designated voucher in the ADF and cause them to be scanning-processed.

The scanner 2 correlates the image information on the voucher read and the information on the instructing image, which are transmitted to the document processing apparatus 1. The document processing apparatus 1 stores the received image information on the voucher and information on the instructing image so as to correlate with each other. Further, the document processing apparatus 1 analyzes the image of the entry column (C) of the instructing image received thereby to extract a difference between the manner of the actual voucher received and the information managed in the voucher database, which is recorded and reflected in the voucher database. If the information on the number of pages is extracted from the image at the position corresponding to the page entry column of the image of the entry column (C) of the instructing image received, the document processing apparatus 1 updates, by the information on the number of pages extracted, the information on the number of pages of the voucher corresponding to the instructing image received of the voucher database. The document processing apparatus 1, if it detects that any information has been described by the voucher collector on the image at the position corresponding to the entry column of the distinction of single-sided/double-sided of the image of the entry column (C) of the instructing image received, updates the information on single-sided/double-sided corresponding to the instructing image received of the voucher database to a value different from the present value. For example, if the pertinent information is presently managed as "single-sided", it will be changed to "double-sided", whereas if the pertinent information is presently managed as "double-sided", it will be changed to "single-sided". Further, the document processing apparatus 1, if it detects that the fact that any information has been described by the voucher collector on the image at the position corresponding to the page entry column of the image of the entry column (C) of the instructing image received, updates the page entry column to the information that there is not the voucher corresponding to the instructing image in the voucher database. The document processing apparatus 1, if it detects that there is any description on the free entry column (D), cuts out the image in the region of the free entry column (D) and stores it so as correlate with the voucher corresponding to the instructing image.

Now, as described above, where the document processing apparatus 1 detects that any information has been described by the voucher collector on the entry column (C) or free entry column (D) of the instructing image corresponding to the voucher received, it represents that the information that a difference exists has been entered as a result that the voucher collector compared the actual voucher and the information indicated on the instructing image. Thus, there is a high possibility that any difference exists between the actual voucher and the information on the voucher managed in the voucher database. It means that there is a high possibility that in the processing of the business process, exceptional processing has been performed or the processing has not been suitably. This information is important in the audit of the business process.

Further, the scanner 2 may change the reading condition of each voucher on the basis of the instructing image read. For example, it is assumed that the voucher collector sets, with the instructing image arranged as a top, sets vouchers arranged in the order described on the instructing image in the ADF of the scanner 2. At this time, the scanner 2 acquires the information on each voucher in the order described on the instructing image.

Namely, the scanner 2 acquires the information on the printing manner supposed about the voucher to be subsequently read. The scanner 2 further checks if or not there is any entry on the entry column (C) related to the pertinent voucher.

Now, if there is no entry on the entry column (C), the scanner 2 determines the reading condition on the basis of the information on the printing manner acquired. If there is any item of the printing manner entered on the entry column (C), the scanner 2 updates, by the entered contents, the pertinent item with any entry of the information on the printing manner acquired, thereby determining the reading condition.

For example, although the supposed printing manner is "two pages in total, A4 size and single-sided", if there is the entry indicative of "not single-sided" on the entry column, the scanner 2 determines the reading manner that the printing manner is "two pages in total, A4 size and double-sided", and further reads the subsequent voucher. If there is any entry on the entry column of the number of pages, a handwritten numeral entered on the pertinent entry column may be acquired by character recognition processing.

Further, on the entry column C related to the voucher to be subsequently read, if there is the entry indicative of that the pertinent voucher does not exist, the scanner 2 stops reading of the pertinent voucher and acquires the information on the printing manner of the subsequent voucher.

The scanner 2 may store at least a part of the information acquired from the instructing image in a designated storing destination so as to correlate with the information on the image of the document acquired by reading. For example, the scanner 2 extracts the document identifier of the document to be processed from the instructing image. Further, the scanner 2, referring to the reading condition determined on the basis of the instructing image, stores each image (image of each page) of the document acquired by reading so as to correlate with the document identifier.

For example, as regards the document with a document identifier X, if the reading condition has been determined to be "two pages, A4 size and double-sided", the image corresponding to the two pages is the image acquired by reading the document specified by the pertinent document identifier.

Therefore, the scanner 2 acquires the total number of pages from the reading condition and, for the number of pages thus acquired, stores the image of the document acquired by reading so as to correlate with the document identifier corresponding to the pertinent document. The image of the document may be further correlated with the reading condition when the image of the pertinent document is read.

Thus, in the storage unit 12 of the document processing apparatus 1, as illustrated in FIG. 6, the document image, document identifier and reading condition are stored so as to be correlated with one another.

In the explanation hitherto made, it was assumed that the instructing image was single, but a plurality of instructing images maybe created so as to the respective vouchers. In this case, since the instructing image may be read precedently to the corresponding voucher, the voucher collector may cause the scanner 2 to alternately read the instructing image and the corresponding voucher, may cause the scanner 2 to successively read the corresponding voucher superposed on a subsequent page to the paper of the first instructing image and the corresponding voucher superposed on a subsequent page to the paper of the second instructing image, or otherwise may cause the scanner 2 to read collectively a plurality of instructing images and later successively read the vouchers.

Further, on each voucher, a coded image (e.g. barcode) representative of the document identifier may be previously recorded. In this case, the scanner 2 reads the top page (with the sign image recorded) of the voucher and detects the pertinent sign image from the image of the pertinent voucher read thereby acquiring the document identifier. Further, the reading condition is determined on the basis of the information on the supposed printing manner and information entered on the entry column, recorded on the instructing image so as to correlate with the document identifier acquired. Hereafter, under this reading condition, reading is continued. In this case, the listed order of the vouchers to be processed on the instructing image may be different from the order of reading them.

In the explanation hitherto made, it was supposed that the instructing image was once printed out on a paper medium and read by the scanner 2, but may be provided in other manners. For example, the document processing apparatus 1, which previously stores the instructing image in the storage unit 12, may provide the stored instructing image in accordance with a request from the scanner 2 side.

As a concrete example, where the scanner 2 is provided with a display device equipped with a touch panel, the voucher collector operates the scanner 2 thereby to acquire the instructing image held in the document processing apparatus 1. At this time, if a plurality of instructing images are stored in the storage unit 12, the document processing apparatus 1 may provide a list of them so that the voucher collector can select a target instructing image from the list.

Further, the document processing apparatus 1 may store the identification information of the voucher collector being a sending destination of each instructing image and the instructing image so as to correlate with each other, and in response to inputting of the identification information from the voucher collector, the scanner 2 may send the pertinent identification information as well as a request of the instruction image. Using the identification information received from the scanner 2 and the identification information correlated with the instructing image stored, the document processing apparatus 1 may send the instructing image judged as being capable of providing (e.g. correlated with the identification information agreeing with the identification received) to the scanner 2 being a request source.

The scanner 2 may display this instructing image and electronically receive the entry in the entry column C. Specifically, the scanner 2 can receive the distinction of single-sided/double-sided, the number of pages of the actual voucher, etc. by the operation of the keyboard or touch panel.

In this way, where the scanner 2 acquires the instructing image from the document processing apparatus 1, this instructing image needs not to be formed on the medium. The scanner 2 may execute the processing of determining the reading condition on the basis of the information of the instructing image acquired.

Further, it was assumed herein that the document to be matched was the voucher, but the document should not be limited to the voucher. Any document may be matched as long as it is employed in the business process.

Figure 7:
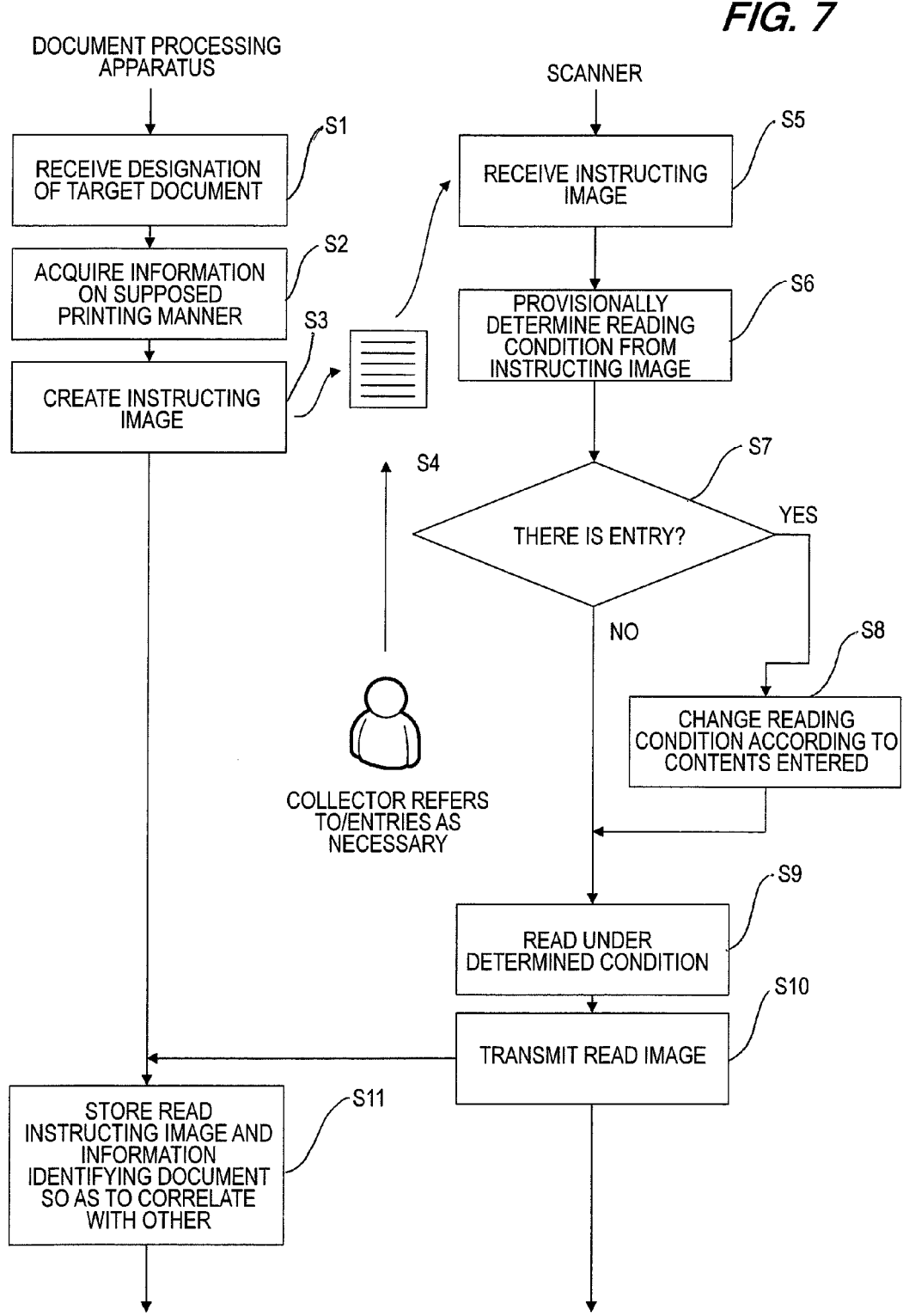
FIG. 7 is a flowchart showing an example of the operation in the document processing system according to an embodiment of this invention.

As understood from the description hitherto made, in the document processing system according to this embodiment, as shown in FIG. 7, the document processing apparatus 1 receives a list of documents designated by the planner (S1) and acquires the information on the supposed printing manner of a pertinent designated document (S2). The document processing apparatus 1 creates an instructing image including the information for identifying the pertinent designated document, information of the printing manner acquired and an entry column for entering that the printing manner acquired is different from that of an actual document, and outputs the instructing image thus created (S3).

The person in charge of collection receives the instructing image and for example, prints out it. The person in charge of collection collects the document(s) identified by the information contained in the instructing image. If the supposed printing manner described on the instructing image is different from that of the document actually collected, the person in charge of collection enters this fact on the instructing image. If the document instructed to be collected is not found, the person in charge of collection enters the fact that there is no document (information entering: S4).

The person in charge of collection designates the instructing image by causing the scanner 2 to read the instructing image (S5), and instructs the scanner 2 to read the document instructed to be read on the instructing image. The scanner 2 acquires the information on the supposed printing manner of the document to be read and provisionally determines the reading condition (S6). Further, the scanner 2 checks if or not the information indicative of that there is a difference in the printing manner about the pertinent document and/or that the pertinent document does not exist is entered (S7).

If there is any entry, the scanner 2 changes the reading condition according to the contents entered (S8). If not, the scanner 2 determines to use the reading condition provisionally determined in S6 as it is. Further, the scanner 2 reads the image of each document under the reading condition determined for each document in the processing from S6 to S8 (S9), and transmits the images thus read to the document processing apparatus 1 (S10).

The document processing apparatus 1 receives the part of the instructing image and document image, and stores the part of the instructing image read by the scanner 2 and document image, read by the scanner 2, and information identifying the document so as to correlate with one another (S11).

In accordance with this embodiment, the image having the entry column informing that the document has not been created under a specified condition is formed. Therefore, using this entry column, it can be clarified whether the document has not been created under the specified condition or erroneously read. Further, in accordance with this embodiment, in matching the document processed by a series of tasks for an audit of the internal control of financial affairs, where the document is read by the scanner to check the contents of the document processed in a series of tasks, it is possible to match, from the storage contents of the document processing apparatus 1, whether or not the document read has been processed in the level required for an audit.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document processing apparatus comprising:
    a storage that stores a characteristic of a document on which a document processing is performed in a series of tasks;
    a creating unit that creates an instructing image including an image of information identifying the document, a description of the characteristic stored in the storage, and an image of a first entry column on which an information indicating that a characteristic of an actual document is different from the stored characteristic is entered;
    an output unit that outputs the instructing image created by the creating unit;
    a receiving unit that receives a read-instructing image corresponding to the instructing image, the read-instructing image being read by an image reading device connected through a communicating line; and
    an extracting unit that extracts first information entered on a second entry portion of the first entry column provided in the read-instructing image received by the receiving unit and second information identifying the document; wherein
    the storage correlates the first information and the second information, and stores the first information and the second information correlated with each other,
    wherein the characteristic of the document describes a form in which the document has been printed and the characteristic of the actual document describe a form in which the actual document has been printed.

2. The document processing apparatus as claimed in claim 1,
    wherein
    the first entry column includes second entry portion on which an indication showing that any document corresponding to information identifying the document does not exist is to be entered.

3. The document processing apparatus as claimed in claim 1,
    wherein
    the receiving unit receives an image of the document corresponding to the information identifying the document; and
    the storage correlated the first information, the second information, and the image of the document corresponding to the information identifying the document extracted by the receiving unit, and stores the correlated with one another.

4. A document processing method comprising:
    storing a characteristic of a document on which the document processing is performed in a series of tasks;
    creating an instructing image that includes an image of information identifying the document, an image of the stored characteristic, and an image of a first entry column on which an information indicating that a characteristic of an actual document is different from the stored characteristic is entered;
    outputting the created instructing image;
    receiving a read-instructing image corresponding to the instructing image;
    extracting first information entered on a first entry portion of the first entry column provided in the received read-instructing image and second information identifying the document; and
    correlating the first information and the second information, and storing the first information and the second information that are correlated with each other,
    wherein the characteristic of the document describes a form in which the document has been printed and the characteristic of the actual document describe a form in which the actual document has been printed.

5. A non-transitory computer readable medium storing a program causing a computer to execute a process for performing a document processing, the process comprising:
    storing a characteristic of a document on which the document processing is performed in a series of tasks;
    creating an instructing image that includes an image of information identifying the document, an image of the stored characteristic, and an image of a first entry column on which an information indicating that a characteristic of an actual document is different from the stored characteristic is entered;

outputting the created instructing image;

receiving a read-instructing image corresponding to the instructing image;

extracting first information entered on a first entry portion of the first entry column provided in the received read-instructing image and second information identifying the document; and correlating the first information and the second information, and storing the first information and the second information that are correlated with each other, wherein the characteristic of the document describes a form in which the document has been printed and the characteristic of the actual document describe a form in which the actual document has been printed.

6. The document processing apparatus as claimed in claim 1, wherein the form indicates at least one of the number of pages, the size of the pages or single/double side printing.

7. The document processing apparatus as claimed in claim 1, wherein the image of information identifying the document includes a barcode representative of the document identifier.

8. The document processing method as claimed in claim 4, wherein the form indicates at least one of the number of pages, the size of the pages or single/double side printing.

9. The document processing method as claimed in claim 4, wherein the image of information identifying the document includes a barcode representative of the document identifier.

10. The process for performing document processing according to claim 5, wherein the form indicates at least one of the number of pages, the size of the pages or single/double side printing.

11. The document processing apparatus according to claim 1,
    wherein the characteristic of the document indicates a format of the document, and the characteristic of the actual document indicates a format of the actual document.

12. The document processing method according to claim 1, wherein the characteristic of the document indicates a format of the document, and the characteristic of the actual document indicates a format of the actual document.

13. The process for performing document processing according to claim 5, wherein the characteristic of the document indicates a format of the document, and the characteristic of the actual document indicates a format of the actual document.

* * * * *